US005433642A

United States Patent [19]

Chia

[11] Patent Number: 5,433,642

[45] Date of Patent: Jul. 18, 1995

[54] TOY MARKING DEVICE WITH CHANGING DISPLAY

[76] Inventor: Francis Chia, 17 Kadoorie Ave., Kowloon, Hong Kong

[21] Appl. No.: 213,851

[22] Filed: Mar. 16, 1994

[51] Int. Cl.[6] .................... A63M 33/00; B23K 29/00

[52] U.S. Cl. .................................... 446/71; 401/195

[58] Field of Search .................... 401/52, 195; 446/3, 446/71, 72, 73, 74, 15, 16, 17, 18, 19, 243, 244, 485

[56] References Cited

U.S. PATENT DOCUMENTS

| | | | |
|---|---|---|---|
| D. 209,112 | 10/1967 | Plassmann et al. . | |
| 2,233,640 | 3/1941 | Pizzarelli | 446/244 X |
| 2,722,776 | 11/1955 | Lewis . | |
| 3,390,460 | 7/1968 | Brown et al. . | |
| 3,638,319 | 2/1972 | Barlow et al. . | |
| 3,997,972 | 12/1976 | Jaunarajs . | |
| 4,274,639 | 6/1981 | Flanders | 446/243 X |
| 4,468,146 | 8/1984 | Tabachnik . | |
| 4,655,723 | 4/1987 | Marason, Jr. et al. | 446/241 |
| 4,763,355 | 8/1988 | Cox | 401/195 X |
| 4,804,346 | 2/1989 | Sheng | 446/19 X |
| 5,037,346 | 8/1991 | Cimock | 446/485 X |
| 5,086,577 | 2/1992 | Abernethy | 401/195 X |
| 5,158,384 | 10/1992 | Radmilovic et al. . | |
| 5,171,181 | 12/1992 | Freeman | 446/241 |
| 5,186,562 | 2/1993 | Yoshinaga et al. . | |
| 5,208,987 | 5/1993 | Christen . | |
| 5,251,112 | 10/1993 | Chen . | |

FOREIGN PATENT DOCUMENTS

| | | | |
|---|---|---|---|
| 2219255 | 12/1989 | United Kingdom | 401/195 |

*Primary Examiner*—Robert A. Hafer
*Assistant Examiner*—D. Neal Muir
*Attorney, Agent, or Firm*—Samuelson & Jacob

[57] ABSTRACT

An improvement in a toy marking device of the type in which a writing tip is carried by a housing, and an oscillating mechanism in the housing is selectively actuated to impart oscillatory motion to the writing tip, the improvement including a visible display coupled with the oscillating mechanism for oscillation in response to actuation of the oscillating mechanism, the visible display including at least one visible element coupled with the visible display such that the visible element is excited by the oscillation of the visible display into movement providing a viewable changing effect during actuation of the oscillating mechanism.

2 Claims, 4 Drawing Sheets

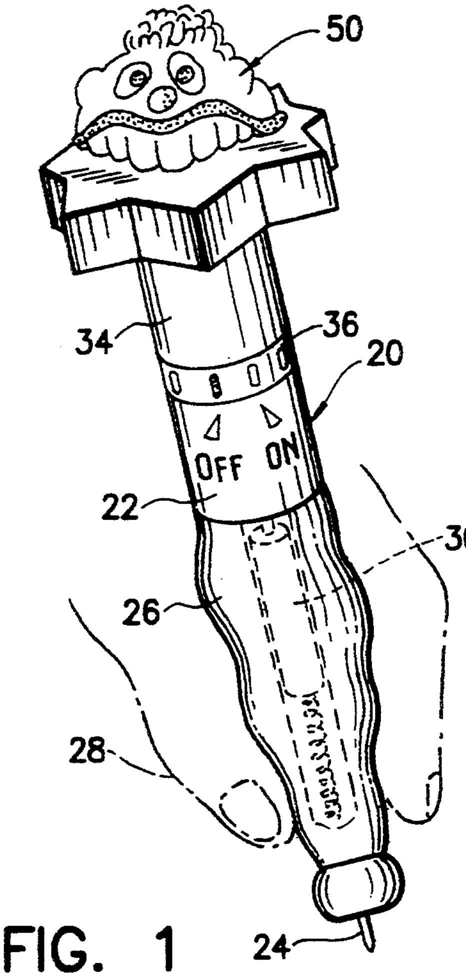
FIG. 1
FIG. 2
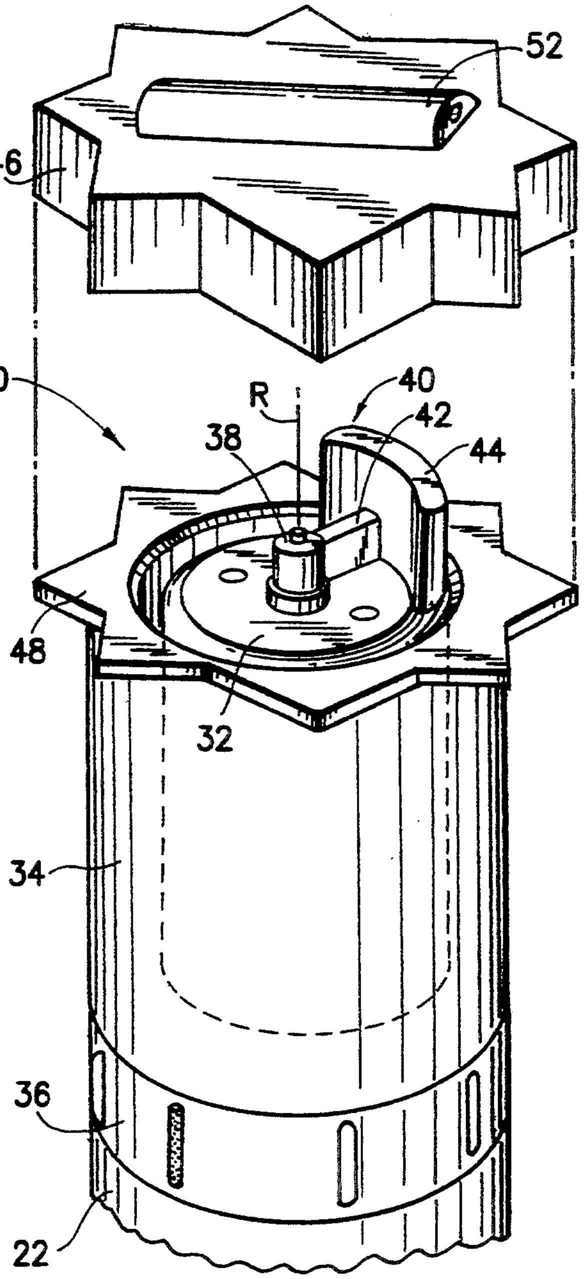

TOY MARKING DEVICE WITH CHANGING DISPLAY

BACKGROUND OF THE INVENTION

1. Field of the Invention

The present invention relates generally to amusement devices and pertains, more specifically, to an improvement in a toy marking device of the type in which a writing tip is oscillated while writing to produce amusing effects.

2. Description of the Invention

Toy marking devices in which a writing tip is oscillated during writing to produce amusing effects have become quite popular. These devices usually include a housing carrying the writing tip and a battery-operated motor which, when operated, actuates an oscillating mechanism which, in turn, oscillates the housing and the writing tip. One such marking device is described in U.S. Pat. No. 5,208,987, in which there is illustrated a writing tip oscillated by a motor-driven oscillating mechanism.

SUMMARY OF THE INVENTION

The present invention provides an improvement which employs the oscillation of the oscillating mechanism of the toy marking device to induce movement in a visible display coupled with the oscillating mechanism for further amusing effects. As such, the present invention attains several objects and advantages, some of which are summarized as follows: Enhances a currently popular toy marking device with a visible display which provides additional amusing effects; utilizes the available oscillation of the existing toy marking device to induce unique visual effects for added amusement; adds to the desirability of an already popular toy device by taking advantage of characteristics already present in the toy device; provides a simple and economical enhancement to an existing toy device; renders an existing toy marking device more attractive to a wider audience for more widespread use.

The above objects and advantages, as well as further objects and advantages, are attained by the present invention which may be described briefly as an improvement in a toy marking device of the type in which a writing tip is carried by a housing, and an oscillating means in the housing is selectively actuated to impart oscillatory motion to the writing tip, the improvement comprising: visible display means coupled with the oscillating means for oscillation in response to actuation of the oscillating means, the visible display means including at least one visible element; and coupling means coupling the visible element with the visible display means such that the visible element is excited by the oscillation of the visible display means into movement providing a viewable changing effect during actuation of the oscillating means.

BRIEF DESCRIPTION OF THE DRAWINGS

The invention will be understood more fully, while still further objects and advantages will become apparent, in the following detailed description of preferred embodiments of the invention illustrated in the accompanying drawing, in which:

FIG. 1 is a pictorial perspective view of a toy marking device incorporating the improvement of the present invention;

FIG. 2 is an enlarged fragmentary exploded pictorial perspective view of the device of FIG. 1, with parts deleted for illustrative purposes;

DESCRIPTION OF THE PREFERRED EMBODIMENTS

Figure 3:
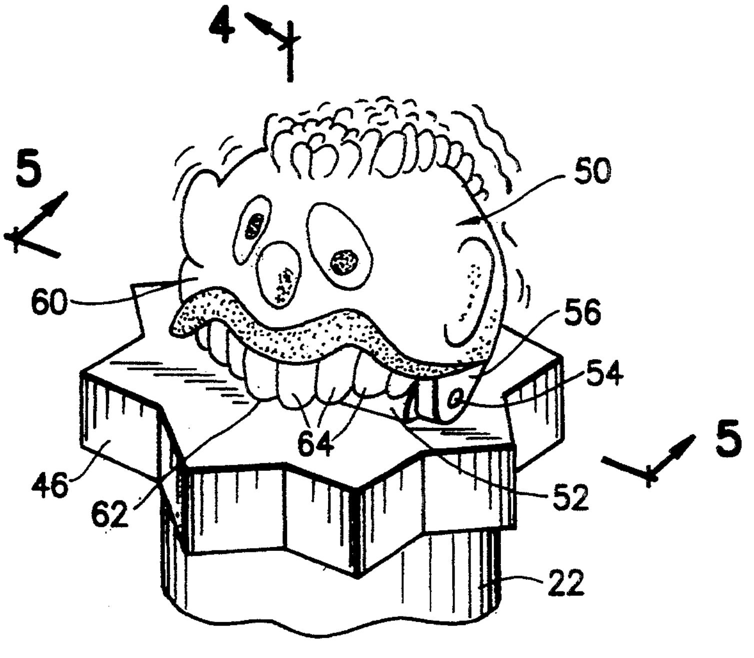
FIG. 3 is an enlarged pictorial perspective view of a portion of the device of FIG. 1.

Referring now to the drawing, and especially to FIGS. 1 and 2 thereof, a toy marking device 20 is seen to have a housing 22 which carries a writing tip 24. Housing 22 includes a lower handgrip portion 26 for being gripped by the hand 28 of the person writing with the marking device 20. A battery 30 is housed within the lower handgrip portion 26 of the housing 22 and is connected electrically to a motor 32 carried by an upper portion 34 of the housing 22, through an electrical switch 36, the motor 32 having a drive shaft 38. An oscillating mechanism 40 is coupled to the motor 32 and is seen to include an arm 42 affixed to the drive shaft 38 of the motor 32 and carrying a weight 44 which is integral with the arm 42 and is offset from the drive shaft 38. Upon turning the switch 36 to the "ON" position, the motor 32 will be operated to actuate the oscillating mechanism 40, that is, the drive shaft 38 will rotate about an axis of rotation R to rotate the arm 42 and the offset weight 44, thereby inducing a wobble in the housing 22, which wobble is transmitted to the writing tip 24 to cause the writing tip 24 to oscillate for amusing effects.

Figure 4:
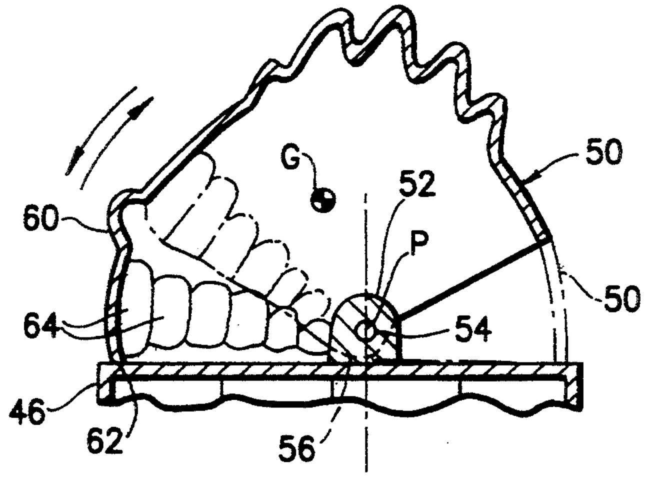
FIG. 4 is a cross-sectional view taken along line 4—4 of FIG. 3.
Figure 5:
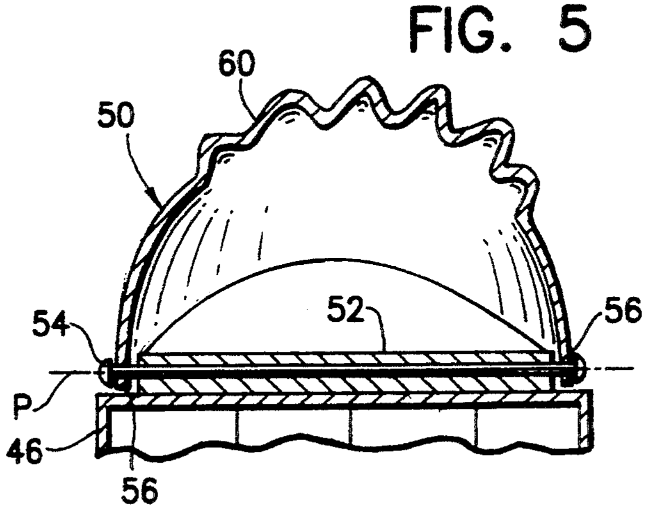
FIG. 5 is a cross-sectional view taken along line 5—5 of FIG. 3.

The improvement of the present invention includes a visible display coupled with the oscillating mechanism 40 for oscillation in response to actuation of the oscillating mechanism 40 to provide a viewable changing effect during actuation of the oscillating mechanism 40. Thus, as seen in FIGS. 3 through 5, as well as in FIGS. 1 and 2, an end cover member 46 is fitted onto the housing 22 and is affixed to the housing 22 for oscillating movement with the housing 22 in response to operation of the motor 32 and actuation of the oscillating mechanism 40, the affixation being by securement of the end cover member 46 to a complementary flange 48 on the housing 22. The visible display includes a shell-like member 50 mounted upon the cover member 46 for rocking movement in fore and aft directions, as indicated by the arrows, in response to the actuation of the oscillating mechanism 40. To this end, a pillow block 52 is integral with end cover member 46 and projects upwardly from the end cover member 46. A pins 54 extends through the pillow block 52 and through corresponding ears 56 on the shell-like member 50 such that the shell-like member 50 is mounted for free pivotal rocking movements relative to the end cover member 46 about a pivotal axis P transverse to the axis of rotation R. As illustrated in FIG. 4, the pivotal axis P is offset from the center of gravity G of the shell-like member 50 so that the shell-like member 50 normally is biased into the forward position shown in FIG. 4. Upon operation of motor 32, and concomitant actuation of the oscillating mechanism 40, oscillation of the housing 22 will excite shell-like member 50 into rocking motion about pivotal axis P between the fore position, shown in full lines in FIG. 4, and the aft position, shown in phantom. The shell-like member 50 has an external appearance which when viewed in rocking motion provides an amusing visual effect. In this instance, the external appearance is a comic FIG. 60 having a forward edge 62 including a representation of teeth 64 which strike the end cover member 46 during each rocking movement of the shell-like member 50 so that the rocking movements provide not only a visually amusing effect, but sounds creating an audible chattering effect as well.

Figure 6:
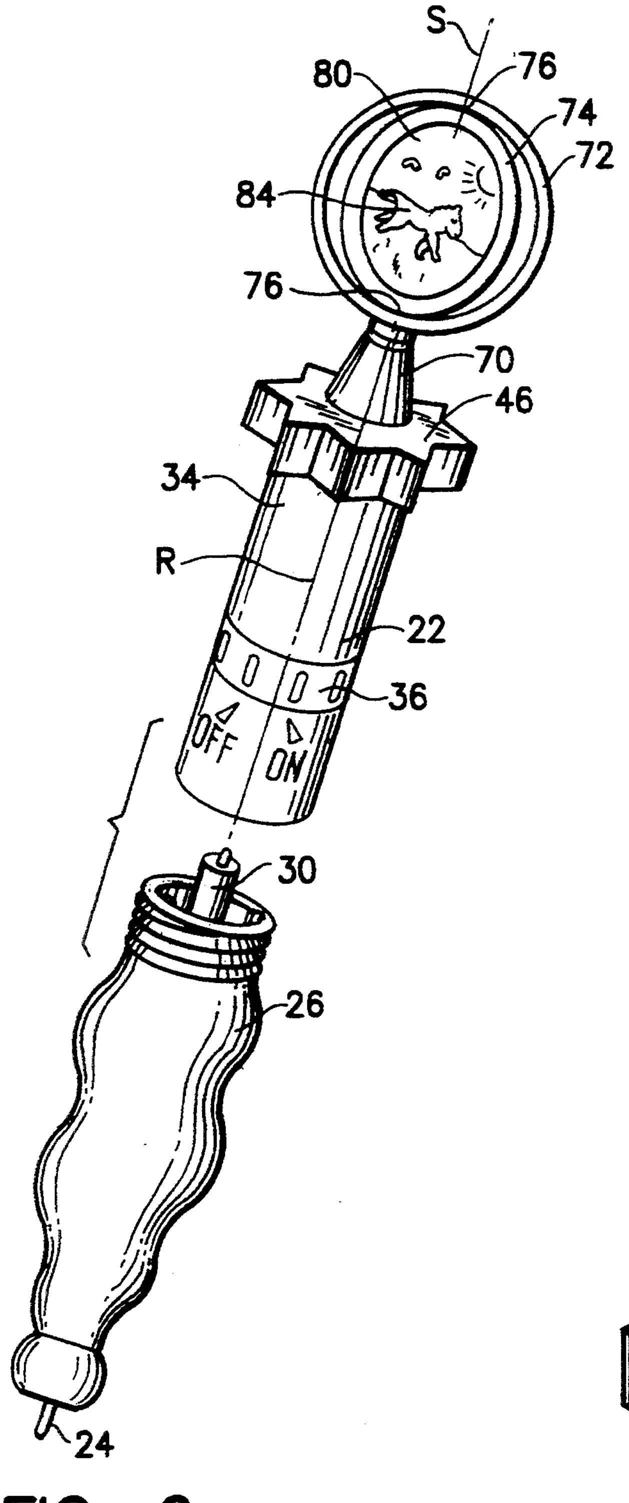
FIG. 6 is an exploded pictorial perspective view of a toy marking device similar to that of FIG. 1, but showing another embodiment of the invention.
Figure 7:
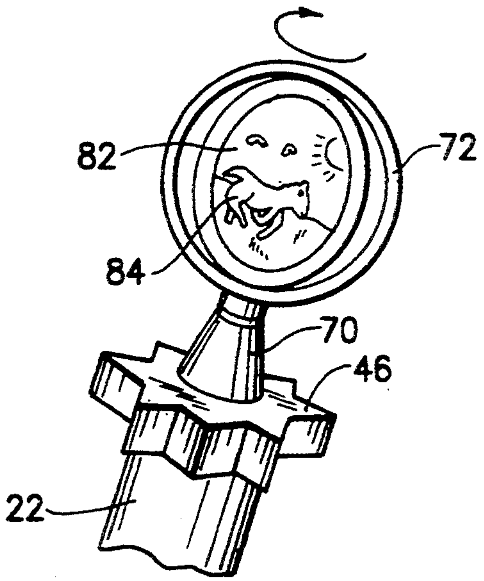
FIG. 7 is a fragmentary pictorial perspective view of the device of FIG. 6.

In the embodiment of FIGS. 6 and 7, end cover member 46 includes a center post 70 affixed to the end cover member 46 and carrying a ring 72. A visible element in the form of a disk 74 is pivotally mounted within the ring 72 at diametrically opposite pivots 76 such that upon operation of motor 32 and concomitant actuation of the oscillating mechanism 40, disk 74 will be excited into spinning about an axis S which is aligned essentially parallel with axis of rotation R. The rotating motion of the disk 74 alone provides an amusing visual effect; however, in order to enhance the visual effect of the spinning disk 74, the disk 74 is provided with an animated changing display. Thus, disk 74 includes an obverse face 80 and a reverse face 82. Obverse face 80 carries an image in a specific stage of motion, such as a horse 84 in one position of a stride, while reverse face 82 carries a sequential image representing another specific stage of motion, such as the horse 84 in another position of the stride. The rapid spinning movement of the disk 74 then presents the viewer with the sequential images to create an image which appears animated through the illustrated stages of motion, in this instance the animated image being that of a horse 84 in full stride.

Figure 8:
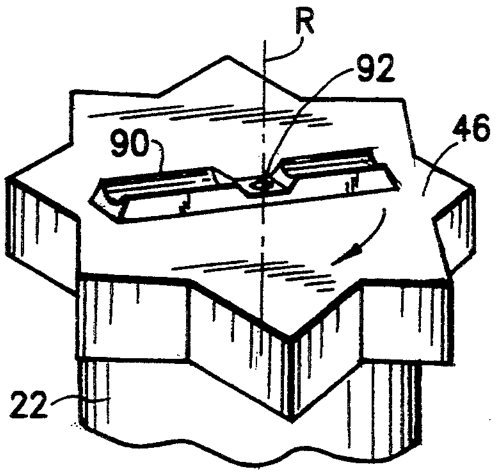
FIG. 8 is an enlarged pictorial perspective view similar to FIG. 3, but showing still another embodiment of the invention.

In the embodiment of FIG. 8, a visible element in the form of a paddle-like member 90 is mounted for rotation upon an axle 92 projecting from the end cover member 46 and aligned with the axis of rotation R. Upon operation of the motor 32, and concomitant actuation of the oscillating mechanism 40, the paddle-like member 90 is excited into rotation about axle 92 for an amusing changing visual effect.

Figure 9:
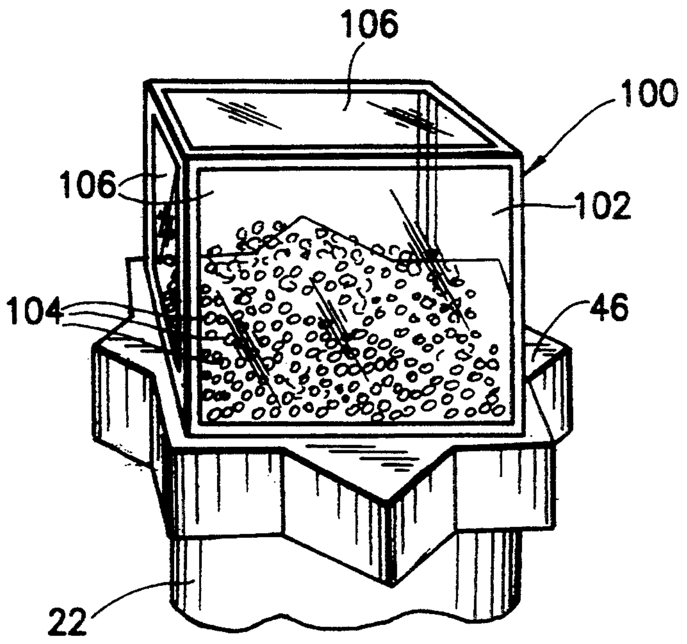
FIG. 9 is a pictorial perspective view similar to FIG. 8, but showing yet another embodiment of the invention.

In the embodiment of FIG. 9, the end cover member 46 carries a box 100 affixed to the end cover member 46 and having an enclosed chamber 102 within which is placed a multiplicity of visible elements in the form of beads 104. The walls 106 of the box 100 are constructed of a transparent material, such as an acrylic synthetic polymeric material, and the beads 104 are made of a relatively light-weight material, such as a foamed styrene synthetic polymeric material. Upon operation of the motor 32, and concomitant actuation of oscillating mechanism 40, box 100 is vibrated and beads 104 are excited into random motion within the chamber 102. The random motion is visible through the transparent walls 106 for an amusing changing visual effect, while the striking of the beads 104 on the walls 106 of the box 100 produces sounds which provide an audible effect.

Figure 10:
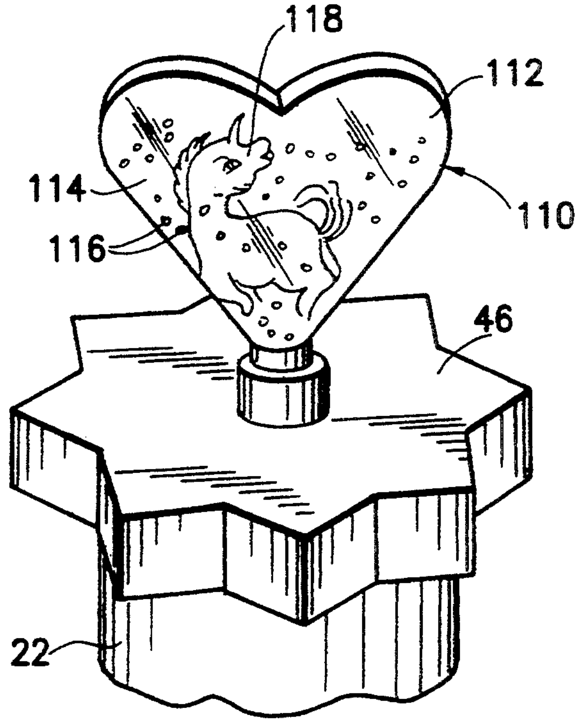
FIG. 10 is a pictorial perspective view similar to FIG. 8, but showing a further embodiment of the invention.

In the embodiment of FIG. 10, the end cover member 46 carries a sealed chamber 110 having a transparent wall 112. Chamber 110 is filled with a transparent liquid medium 114 and visible elements in the form of flakes 116. Optionally, an ornamental FIG. 118 is placed within the sealed chamber 110. Upon operation of the motor 32, and concomitant actuation of the oscillating mechanism 40, flakes 116 are suspended within the liquid medium 114 and are excited into random motion viewable through the transparent wall 112 for an amusing changing visual display.

It will be seen that the improvement of the present invention attains the several objects and advantages summarized above, namely: Enhances a currently popular toy marking device with a visible display which provides additional amusing effects; utilizes the available oscillation of the existing toy marking device to induce unique visual effects for added amusement; adds to the desirability of an already popular toy device by taking advantage of characteristics already present in the toy device; provides a simple and economical enhancement to an existing toy device; renders an existing toy marking device more attractive to a wider audience for more widespread use.

It is to be understood that the above detailed description of preferred embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. An improvement in a toy marking device of the type in which a writing tip is carried by a housing, and an oscillating means in the housing is selectively actuated to impart oscillatory motion to the writing tip, the improvement comprising:

visible display means coupled with the oscillating means for oscillation about an axis of motion in response to actuation of the oscillating means, the visible display means including at least one visible element; and coupling means coupling the visible element with the visible display means such that the visible element is excited by the oscillation of the visible display means into rocking movement about an axis transverse to the axis of motion, thereby providing a viewable changing effect during actuation of the oscillating means;

the visible element including a shell-like member having a comic external appearance, and the coupling means including a pivotal connection between the shell-like member and the housing for enabling rocking of the shell-like member relative to the housing, about the transverse axis, in response to actuation of the oscillating means.

2. The invention of claim 1 wherein the visible display means includes audible means for sounding in response to movement of the visible element.

* * * * *